(12) United States Patent
Schultz et al.

(10) Patent No.: US 9,191,608 B2
(45) Date of Patent: Nov. 17, 2015

(54) SYSTEM AND METHOD FOR DISPLAYING PRIORITY TRANSPORT STREAM DATA IN A PAUSED MULTI-CHANNEL BROADCAST MULTIMEDIA SYSTEM

(75) Inventors: Mark Alan Schultz, Carmel, IN (US); Matthew Lamb, Westfield, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 146 days.

(21) Appl. No.: 12/736,098

(22) PCT Filed: Dec. 15, 2008

(86) PCT No.: PCT/US2008/013712
§ 371 (c)(1),
(2), (4) Date: Sep. 9, 2010

(87) PCT Pub. No.: WO2009/116980
PCT Pub. Date: Sep. 24, 2009

(65) Prior Publication Data
US 2010/0329637 A1    Dec. 30, 2010

Related U.S. Application Data

(60) Provisional application No. 61/070,074, filed on Mar. 20, 2008.

(51) Int. Cl.
*H04N 5/76*    (2006.01)
*H04H 20/59*    (2008.01)
(Continued)

(52) U.S. Cl.
CPC ............... *H04N 5/76* (2013.01); *H04H 20/59* (2013.01); *H04N 21/434* (2013.01); *H04N 21/4316* (2013.01); *H04N 21/4333* (2013.01);
(Continued)

(58) Field of Classification Search
CPC . H04N 21/433; H04N 21/4316; H04N 21/47; H04N 21/80; H04N 21/435
USPC .......................................... 386/230, 349, 249
See application file for complete search history.

(56) References Cited

U.S. PATENT DOCUMENTS

| 4,646,280 A | 2/1987 | Toyosawa |
| 5,357,250 A | 10/1994 | Healey et al. |

(Continued)

FOREIGN PATENT DOCUMENTS

| CN | 1717024 | 1/2006 |
| CN | 1893577 | 1/2007 |

(Continued)

OTHER PUBLICATIONS

In'l Search Report, dated Apr. 1, 2009.
(Continued)

*Primary Examiner* — Helen Shibru
(74) *Attorney, Agent, or Firm* — Robert D. Shedd

(57) ABSTRACT

A pausable system that processes multi-channel, multimedia content including a multimedia content delivery device having a priority detector for determining priority multimedia content and a decoder that can decode the priority content while the system is in a paused state. The system can also output an indicator if a priority multimedia content becomes disrupted based on a received rate compared to an embedded rate. The priority detector can also determine if the priority content is intended for a particular recipient before processing by the multimedia content delivery device.

15 Claims, 5 Drawing Sheets

(51) Int. Cl.
*H04N 21/431* (2011.01)
*H04N 21/434* (2011.01)
*H04N 21/488* (2011.01)
*H04N 21/81* (2011.01)
H04N 21/433 (2011.01)
H04N 21/47 (2011.01)
H04N 5/781 (2006.01)
H04N 5/783 (2006.01)
H04N 5/907 (2006.01)
H04N 9/804 (2006.01)

(52) U.S. Cl.
CPC ....... *H04N21/4344* (2013.01); *H04N 21/4347* (2013.01); *H04N 21/4882* (2013.01); *H04N 21/814* (2013.01); *H04N 21/8146* (2013.01); H04N 5/781 (2013.01); H04N 5/783 (2013.01); H04N 5/907 (2013.01); H04N 9/8042 (2013.01); H04N 21/433 (2013.01); H04N 21/47 (2013.01)

(56) References Cited

U.S. PATENT DOCUMENTS

| | | | |
|---|---|---|---|
| 5,418,863 A | 5/1995 | Ando | |
| 5,510,844 A * | 4/1996 | Cash et al. | 375/240.28 |
| 5,596,647 A | 1/1997 | Wakai et al. | |
| 5,801,786 A * | 9/1998 | Song | 348/564 |
| 5,854,591 A | 12/1998 | Atkinson | |
| 5,896,129 A | 4/1999 | Murphy et al. | |
| 5,956,094 A * | 9/1999 | Chun | 348/564 |
| 5,973,722 A | 10/1999 | Wakai et al. | |
| 5,995,553 A | 11/1999 | Crandall et al. | |
| 6,014,381 A | 1/2000 | Troxel et al. | |
| 6,052,384 A | 4/2000 | Huang et al. | |
| 6,058,288 A | 5/2000 | Reed et al. | |
| 6,249,913 B1 | 6/2001 | Galipeau et al. | |
| 6,262,737 B1 | 7/2001 | Li et al. | |
| 6,278,375 B1 | 8/2001 | Hucker | |
| 6,323,767 B1 | 11/2001 | Gropper | |
| 6,363,207 B1 | 3/2002 | Duruoz et al. | |
| 6,377,188 B1 | 4/2002 | Maruyama | |
| 6,393,343 B1 | 5/2002 | Frey et al. | |
| 6,463,273 B1 | 10/2002 | Day | |
| 6,539,548 B1 | 3/2003 | Hendricks et al. | |
| 6,559,812 B1 | 5/2003 | McCarten et al. | |
| 6,728,269 B1 | 4/2004 | Godwin et al. | |
| 6,744,967 B2 | 6/2004 | Kaminski et al. | |
| 6,745,021 B1 | 6/2004 | Stevens | |
| 6,762,733 B2 | 7/2004 | Smith et al. | |
| 6,813,777 B1 | 11/2004 | Weinberger et al. | |
| 6,938,258 B1 | 8/2005 | Weinberger et al. | |
| 6,978,424 B2 | 12/2005 | Safadi | |
| 7,003,052 B2 | 2/2006 | Koike et al. | |
| 7,028,304 B1 * | 4/2006 | Weinberger et al. | 719/310 |
| 7,075,945 B2 | 7/2006 | Arsenault et al. | |
| 7,114,171 B2 | 9/2006 | Brady, Jr. et al. | |
| 7,130,724 B2 | 10/2006 | Petersen et al. | |
| 7,159,230 B2 | 1/2007 | Manson et al. | |
| 7,159,231 B1 | 1/2007 | Clark | |
| 7,167,639 B2 | 1/2007 | Haddad et al. | |
| 7,174,085 B2 | 2/2007 | Demas et al. | |
| 7,177,522 B2 | 2/2007 | MacInnis | |
| 7,194,611 B2 | 3/2007 | Bear et al. | |
| 7,197,234 B1 | 3/2007 | Chatterson | |
| 7,200,859 B1 | 4/2007 | Perlman et al. | |
| 7,230,652 B2 | 6/2007 | Demas et al. | |
| 7,257,308 B2 | 8/2007 | Plourde, Jr. et al. | |
| 7,260,312 B2 | 8/2007 | Srinivasan et al. | |
| 7,272,298 B1 | 9/2007 | Lang et al. | |
| 7,272,300 B2 | 9/2007 | Srinivasan et al. | |
| 7,292,604 B2 | 11/2007 | Godwin et al. | |
| 7,409,140 B2 | 8/2008 | Rodriguez et al. | |
| 7,565,104 B1 | 7/2009 | Brown et al. | |
| 7,640,566 B1 | 12/2009 | Taylor et al. | |
| 7,788,395 B2 | 8/2010 | Bowra et al. | |
| 8,049,821 B2 * | 11/2011 | Campbell | 348/731 |
| 2002/0024973 A1 | 2/2002 | Tavana et al. | |
| 2002/0039481 A1 | 4/2002 | Jun et al. | |
| 2002/0118951 A1 | 8/2002 | Suzuki et al. | |
| 2002/0152470 A1 | 10/2002 | Hammond | |
| 2002/0177996 A1 | 11/2002 | Cooper et al. | |
| 2003/0025599 A1 | 2/2003 | Monroe | |
| 2003/0037331 A1 | 2/2003 | Lee | |
| 2003/0084451 A1 | 5/2003 | Pierzga et al. | |
| 2003/0093798 A1 | 5/2003 | Rogerson | |
| 2003/0114107 A1 | 6/2003 | Aoyagi | |
| 2003/0115369 A1 | 6/2003 | Walter et al. | |
| 2003/0117959 A1 | 6/2003 | Taranov | |
| 2003/0208764 A1 | 11/2003 | Galipeau et al. | |
| 2004/0022236 A1 | 2/2004 | Blanco et al. | |
| 2004/0073937 A1 | 4/2004 | Williams | |
| 2004/0136408 A1 * | 7/2004 | Tomobe et al. | 370/532 |
| 2004/0155961 A1 | 8/2004 | Litwin, Jr. et al. | |
| 2004/0205266 A1 * | 10/2004 | Regal et al. | 710/29 |
| 2005/0036512 A1 | 2/2005 | Loukianov | |
| 2005/0083861 A1 | 4/2005 | Van Den Heuvel et al. | |
| 2005/0117583 A1 | 6/2005 | Uchida et al. | |
| 2005/0135787 A1 * | 6/2005 | Yoo et al. | 386/95 |
| 2005/0138659 A1 | 6/2005 | Boccon-Gibod et al. | |
| 2005/0152406 A2 | 7/2005 | Chauveau | |
| 2005/0201399 A1 | 9/2005 | Woodward, Jr. et al. | |
| 2005/0201629 A1 | 9/2005 | Karczewicz et al. | |
| 2006/0020992 A1 | 1/2006 | Pugel et al. | |
| 2006/0029359 A1 | 2/2006 | Shigehara et al. | |
| 2006/0136965 A1 | 6/2006 | Ellis et al. | |
| 2006/0160545 A1 | 7/2006 | Goren et al. | |
| 2006/0193454 A1 | 8/2006 | Abou-Chakra et al. | |
| 2006/0224761 A1 | 10/2006 | Howarth et al. | |
| 2006/0257099 A1 | 11/2006 | Potrebic et al. | |
| 2006/0275022 A1 | 12/2006 | Perlman et al. | |
| 2006/0275023 A1 | 12/2006 | Perlman et al. | |
| 2006/0277316 A1 | 12/2006 | Wang et al. | |
| 2007/0003230 A1 | 1/2007 | Cho | |
| 2007/0011343 A1 | 1/2007 | Davis et al. | |
| 2007/0021099 A1 | 1/2007 | Sato | |
| 2007/0065122 A1 | 3/2007 | Chatterton | |
| 2007/0086488 A1 | 4/2007 | Kim et al. | |
| 2007/0092078 A1 | 4/2007 | Yoshida et al. | |
| 2007/0107019 A1 | 5/2007 | Romano et al. | |
| 2007/0113290 A1 | 5/2007 | Charles et al. | |
| 2007/0127887 A1 | 6/2007 | Yap et al. | |
| 2007/0127891 A1 | 6/2007 | Demas et al. | |
| 2007/0130597 A1 | 6/2007 | Parker et al. | |
| 2007/0136743 A1 | 6/2007 | Hasek et al. | |
| 2007/0143809 A1 | 6/2007 | Chen et al. | |
| 2007/0143813 A1 | 6/2007 | Chen et al. | |
| 2007/0162392 A1 | 7/2007 | McEnroe et al. | |
| 2007/0166001 A1 | 7/2007 | Barton et al. | |
| 2007/0168188 A1 | 7/2007 | Choi | |
| 2007/0180465 A1 | 8/2007 | Ou et al. | |
| 2007/0192613 A1 * | 8/2007 | Amoroso et al. | 713/179 |
| 2007/0203739 A1 * | 8/2007 | Williams | 705/1 |
| 2007/0230899 A1 | 10/2007 | Shiiyama | |
| 2008/0066073 A1 | 3/2008 | Sen | |
| 2008/0212525 A1 | 9/2008 | Tervonen et al. | |
| 2008/0240097 A1 | 10/2008 | Kim et al. | |
| 2009/0003225 A1 | 1/2009 | Klassen et al. | |
| 2009/0069033 A1 | 3/2009 | Karstens et al. | |
| 2009/0320075 A1 | 12/2009 | Marko | |
| 2011/0007745 A1 * | 1/2011 | Schultz et al. | 370/394 |
| 2011/0307548 A1 * | 12/2011 | Fisk et al. | 709/203 |

FOREIGN PATENT DOCUMENTS

| | | |
|---|---|---|
| CN | 1902697 | 1/2007 |
| CN | 1909696 | 2/2007 |
| EP | 0813341 | 12/1997 |
| EP | 0907281 | 4/1999 |
| EP | 1175091 | 1/2002 |
| EP | 1283639 | 2/2003 |
| EP | 1594317 | 11/2005 |
| EP | 1739676 | 1/2007 |
| EP | 1781034 | 5/2007 |

(56) References Cited

FOREIGN PATENT DOCUMENTS

| | | |
|---|---|---|
| JP | 58131825 | 8/1983 |
| JP | 58186237 | 10/1983 |
| JP | 01288190 | 11/1989 |
| JP | 578043 | 10/1993 |
| JP | 7130150 | 5/1995 |
| JP | 2001008200 | 1/2001 |
| JP | 2001054066 | 2/2001 |
| JP | 2001160940 | 6/2001 |
| JP | 2001312992 | 11/2001 |
| JP | 2002112199 | 4/2002 |
| JP | 2002135729 | 5/2002 |
| JP | 2002269910 | 9/2002 |
| JP | 2002335467 | 11/2002 |
| JP | 2003163892 | 6/2003 |
| JP | 200423591 | 1/2004 |
| JP | 2004248138 | 9/2004 |
| JP | 2004282644 | 10/2004 |
| JP | 2005184519 | 7/2005 |
| JP | 2005244404 | 9/2005 |
| JP | 2005310365 | 11/2005 |
| JP | 2005318049 | 11/2005 |
| JP | 2005535170 | 11/2005 |
| JP | 200623748 | 1/2006 |
| JP | 2006109301 | 4/2006 |
| JP | 2006186580 | 7/2006 |
| JP | 2006246297 | 9/2006 |
| JP | 200753738 | 3/2007 |
| JP | 2007158432 | 6/2007 |
| JP | 2007281922 | 10/2007 |
| JP | 2008005085 | 1/2008 |
| JP | 2008193295 | 8/2008 |
| JP | 2008539638 | 11/2008 |
| KR | 100800715 | 2/2008 |
| WO | WO9843376 | 10/1998 |
| WO | WO0072592 | 11/2000 |
| WO | WO02071756 | 9/2002 |
| WO | WO03019932 | 3/2003 |
| WO | WO03024085 | 3/2003 |
| WO | WO03032620 | 4/2003 |
| WO | WO03067594 | 8/2003 |
| WO | WO03075574 | 9/2003 |
| WO | WO03092281 | 11/2003 |
| WO | WO2004034707 | 4/2004 |
| WO | WO2005045830 | 5/2005 |
| WO | WO2006114759 | 11/2006 |
| WO | WO2007036833 | 4/2007 |
| WO | WO2007038131 | 4/2007 |
| WO | WO2007056108 | 5/2007 |
| WO | WO2007063430 | 6/2007 |
| WO | WO2007076042 | 7/2007 |
| WO | WO2007130150 | 11/2007 |
| WO | WO2008026187 | 3/2008 |
| WO | WO2009117050 | 9/2009 |

OTHER PUBLICATIONS

Business Wire, "AMD Powers Up AMD Live!(TM) Home Media Server Introducing Easy, Universal Control of a Home Network", Nov. 5, 2007.

AT&T, AT&T Introduces U-Verse in Austin, Business Wire, Nov. 8, 2007.

Monsoon, "HAVA Video Streaming and Place-Shifting Devices", Press Release, Nov. 7, 2007.

* cited by examiner

SYSTEM AND METHOD FOR DISPLAYING PRIORITY TRANSPORT STREAM DATA IN A PAUSED MULTI-CHANNEL BROADCAST MULTIMEDIA SYSTEM

RELATED APPLICATIONS

This application claims the benefit, under 35 U.S.C. §365 of International Application PCT/US2008/013712, filed Dec. 15, 2008, which was published in accordance with PCT Article 21(2) on Sep. 24, 2009 in English and which claims the benefit of United States provisional patent application No. 61/070,074, filed Mar. 20, 2008.

BACKGROUND

Public video distribution systems that allow a delayed display of video or audio such as a pause feature, normally delay all video that is being received. However, in some situations, it is not desirable to pause or delay certain data streams. For example, in the case of 'local content insertion'(LCI) for customers using satellite applications in apartments or planes, additional content can be streamed along with the satellite programs to provide movies and camera feeds. Cable systems also can provide special security streams (high priority data streams) as a service that feeds Set Top Box (STB) Personal Video Recorders (PVR). Even video monitors inside an infant's bedroom in a home can stream MPEG video, and such video might comprise high priority data streams that should not be delayed, paused, or made discontinuous. Internet feeds can also provide remote camera feeds which might be important for security purposes and thus would not be desired to get frozen or delayed along with all of the other data in the event a consumer records/delays or pauses their equipment.

For example, a typical airborne pause system would normally pause or stop the local movies on a plane and all satellite content during pilot announcements. After the announcements, the video would begin to be streamed again in either a real-time or delayed state. If security or safety cameras are included in the LCI content or in a priority satellite channel, pausing these streams or stopping the streams might cause a breach of security or a safety issue, since video would either be lost or not be displayed in real-time. That is, applications such as safety or security video that pass through a system that has a "pause" function activated would be seeing delayed video which would/could be misleading or unsafe.

SUMMARY

In one embodiment according to the present principles, a system and method is provided for allowing the processing of selected priority data streams even when a system is paused or stopped. Any transport stream that is, for example, security data can be labeled as a priority channel and treated as a non-pausable stream in any system that anticipates this feature. For example, normally, a security system and satellite/cable/internet system content are independent systems. However, as systems become more versatile, cost reduced, and full featured, the trend is to try to merge these systems. A system and method according to one embodiment of the present principles provides a solution to allow selected priority signals to be processed for display, even when the decoding device is paused or stopped. If the priority signals are interrupted, the viewer can be notified that the video is discontinuous in time to prevent a false sense of security.

Advantageously, the present system shows how selectively display priority data in systems that use a pause function. Accordingly, even when the main system is paused, the priority data is always shown in real-time. The present system also includes an alert notification to the viewer if the priority feed stream is interrupted as a potential tamper warning.

In one aspect of the present principles, a system for processing data stream content in a multi-channel multimedia system is provided, the system comprising a multimedia content decoder having an input priority detector for detecting at least one priority data stream from an input data stream to process a selected data stream when the multimedia content system is paused. The priority detector can include a disruption indicator when a received rate of a priority data stream is compared to an embedded rate.

According to another aspect, a method for processing data stream content in a multi-channel multimedia system is provided, comprising the steps of selectively processing a multimedia content channel while in a pause mode.

These and other aspects, features and advantages of the present principles will be described or become apparent from the following detailed description of the preferred embodiments, which is to be read in connection with the accompanying drawings.

BRIEF DESCRIPTION OF THE DRAWINGS

In the drawings, wherein like reference numerals denote similar elements throughout the views.

Figure 1:
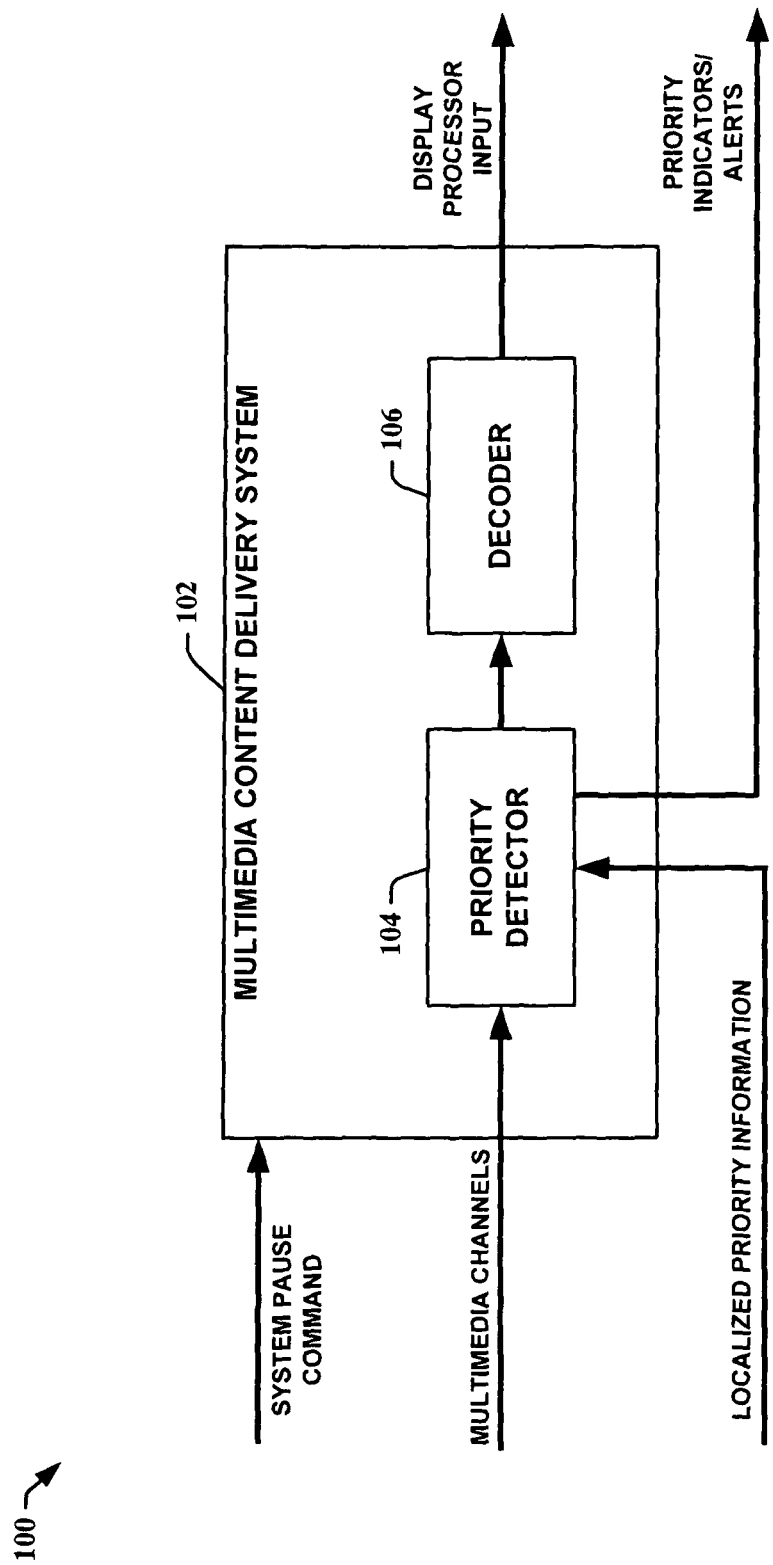
FIG. 1 is an example of a pausable multimedia content delivery system with priority multimedia channel output.

It should be understood that the drawings are for purposes of illustrating the concepts of the present principles and are not necessarily the only possible configurations for illustrating the present principles.

DETAILED DESCRIPTION

A method, apparatus and system for displaying priority data through a pausable multimedia content delivery device. The present system also includes an alert indication to a user if the priority feed stream is disrupted as a potential warning to alert the viewer that the priority data stream might have been tampered with.

Although the present principles will be described primarily within the context of permitting priority data to bypass systems having a pause capability, the specific embodiments of the present principles should not be treated as limiting the scope of the invention. It is appreciated by those skilled in the art and informed by the teachings of the present principles that the concepts of the present principles can be advantageously applied in other environments in which uninterrupted display of priority data is desired, e.g., broadcast television/radio, satellite radio, cable, etc. and in systems which may not have any pause function or capability.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it is appreciated by those skilled in the art that the block diagrams presented herein represent conceptual views of illustrative system components and/or circuitry embodying the principles of the invention. Similarly, it is appreciated that any flow charts, flow diagrams, state transition diagrams, pseudocode, and the like represent various processes which can be substantially represented in computer readable media and so executed by a computer or processor, whether or not such computer or processor is explicitly shown.

In accordance with various embodiments of the present principles, a method, apparatus and system is described for sending high-priority data immediately through a system, even in systems having a pause or delay function, for display to a viewer, for detecting possible tampering of the priority data and for notifying the viewer when the priority data is disrupted.

"Priority data" can comprise any data stream that is desired to be viewed in a continuous stream at all times, e.g., security video, data having time-sensitive information, etc. Data streams can be designated as comprising priority data manually by the user or automatically by the system according to pre-defined criteria. For example, priority data streams can be tagged with packets having a unique Packet Identifier (PID) number to identify them as comprising priority data.

"Non-priority data" can comprise any data stream that can be paused or delayed in the system and thus can be viewed in either real-time or delayed-time. Even in systems having a pause function, the use of a pause delay can be optional.

Content delivery systems are typically configured with a head end unit that gathers content and provides it to downstream individual content delivery systems such as, for example, set top boxes (STB). Some of the content gathered can include streaming channels that can be stored and/or sent directly to the individual content delivery systems. Systems and methods are provided herein that accept this type of content delivery and determine its priority for processing purposes at a localized level. This allows priority determination to be made not only on information or channel selection determined by the head end unit, but also on localized information such as, for example, user identity and/or user input and the like. Content determined to be of a priority can then be processed despite system interruptions such as, for example, a system pause mode and the like. Since the priority determination can be made at a localized level and for specific recipients, for example, each seat in an airplane can have customized video for its location to show how to escape from the plane even during a safety announcement (which typically causes a system pause).

FIG. 1 is an example 100 of a pausable multimedia content delivery system 102 having priority multimedia channel output capability. The multimedia content delivery system 102 utilizes a priority detector 104 to determine if the incoming multimedia channels contain priority content. The multimedia channels can include normal content and/or priority content. The priority content itself can include audio/video priority content and/or priority data content and the like. The term "multimedia" is intended to encompass all forms of content, including data and the like. The priority detector 104 can utilize, for example, MPEG transport signals and/or dedicated packet identifiers (PIDs) and the like to determine if content is of a priority nature. Levels of priority can also be established in a like manner. The priority detector 104 can also utilize localized priority information. The localized priority information can include, but is not limited to, location of the multimedia content delivery system 102, recipient identity, and/or recipient input and the like. For example, a pilot in an aircraft can receive pilot-only content while an airplane navigator can receive important weather information and the like (recipient identify example). In a similar fashion, the pilot could make a choice to also receive the weather information (recipient input example). The location of the system 102 can also facilitate priority determination (e.g., specific emergency exit directions shown for each seat of an aircraft, etc.).

The priority detector 104 can utilize, for example, header and/or identifier information to determine priority of incoming content. One such method that it can interact with is described in relation to a head end unit that establishes content priority. A detector assesses incoming packets and detects priority packets (e.g., security packets). Priority packets, for example, can be provided in priority data streams having a special, unique PID number to enable their recognition. That is, special packets can be filtered to become priority packets from a content source, such as a satellite feed by monitoring the packet header of the incoming data. A detector can then check for a new packet start and at the same time, search for a specific priority packet, and then send it to a priority processor for the timestamp and processing. This would allow selection of, e.g., any one channel or transponder to have a non-paused video in a normally paused system. If it is determined that there is a new packet start, a timestamp can be added. The packet can be flagged with an extra 'start bit' to show when a packet begins.

The detector can be configured to detect a priority packet under any circumstance, regardless of whether the system includes a pause function or not. A detected priority data stream can accordingly cause an alert indicator (e.g., an icon, symbol or message) to be displayed to a recipient on a screen in addition to any other normal (non-priority) video being watched. Such an alert indicator can be displayed simultaneously with the normal video being watched. For example, a tornado alert can be designated as a priority data stream, which could be superimposed on the video content of a satellite system. This aspect would not require a pause function to be present but it would still be a special priority packet that ends up as a signal on a display even though another channel is being watched. Once priority is established, the priority detector 104 allows the content to be processed by a decoder 106 regardless of the status of a pause mode for the system 102. The decoder 106 then can provide input to a display processor for viewing by a recipient.

The priority detector 104 can also be utilized to determine if a disruption has occurred with regard to priority channels. For example, the priority detector 104 can monitor the rate at which incoming information is arriving and compare that to embedded rate information found within the incoming information. The embedded information can include, but is not limited to, actual rate information and/or timing information such as ingoing and outgoing time stamps which can be used to derive rate information. If the priority detector 104 determines that the priority channel has been and/or is being disrupted, it can provide an indicator to a recipient. The indicator can include, but is not limited to, a visual and/or aural indicator such as, for example, a beeping tone and/or a red flag, etc.

Figure 2:
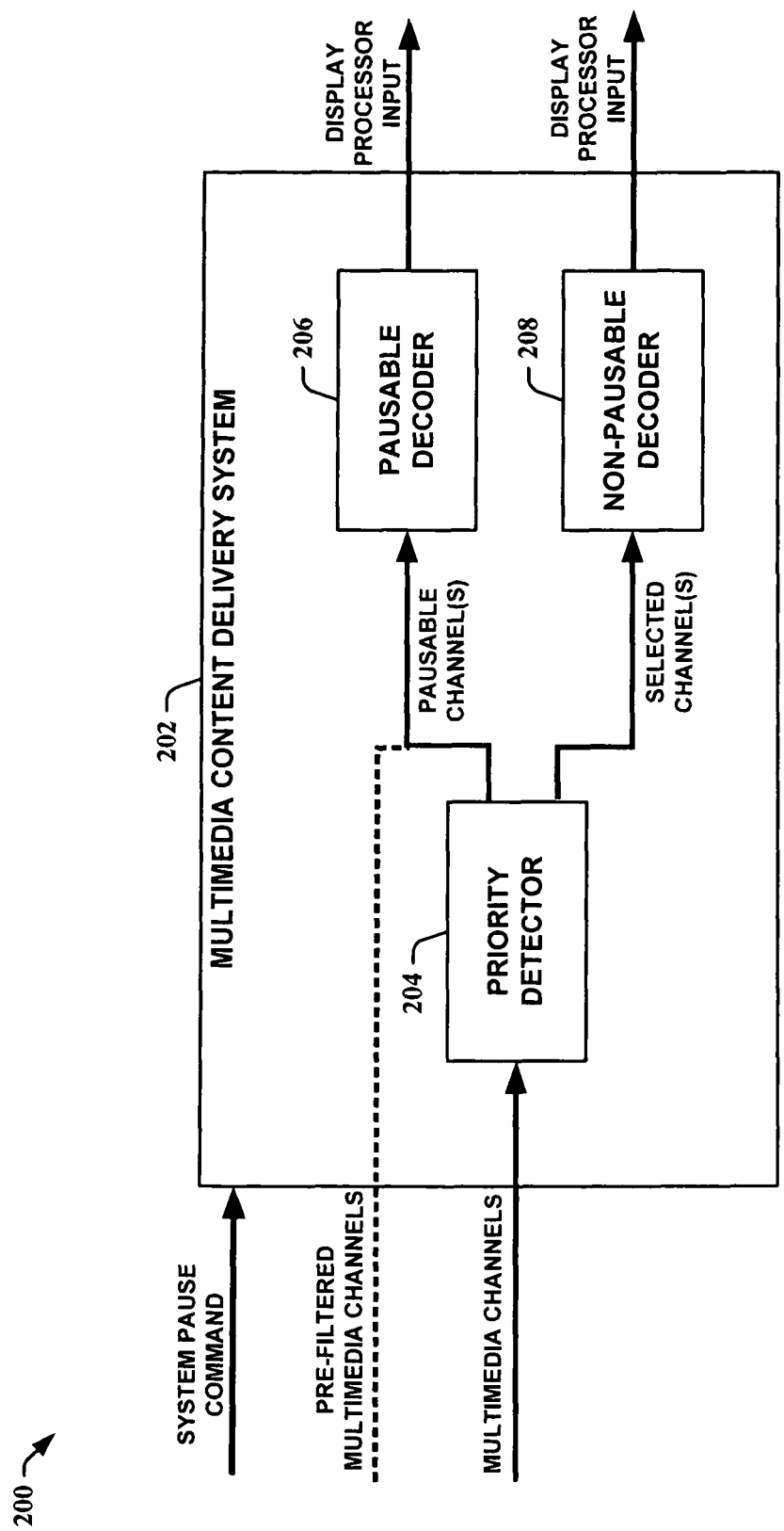
FIG. 2 is an example of a pausable multimedia content delivery system with multiple path processing.

FIG. 2 is an example 200 of a pausable multimedia content delivery system 202 with multiple path processing. The multimedia content delivery system 202 utilizes a priority detector 204 to determine the priority of incoming multimedia channels. If it determines that the content is of a normal nature, it allows decoding of the pausable channels by a pausable decoder 206. However, if it determines that one or more multimedia channels are selected or priority channels, it allows the selected channels to be decoded with a non-pausable decoder 208. The non-pausable decoder 208 can be utilized whether or not a system pause mode is in effect. The use of different decoders allows for priority specific decoders to be utilized such as, for example, high security decoders made to handle security specific decoding. Certain decoding keys may also be required to properly decode security channels which can be, for example, entered by a recipient before decoding is allowed. Channels routed through the non-pausable decoder 208 can be displayed to a recipient regardless of other programming displayed at the time. In a similar fashion, pre-filtered multimedia channels can be allowed direct access to the pausable decoder 206. Pre-filtered multimedia channels are channels that have been previously determined to be non-priority channels. For example, if only movie information is broadcast over a particular channel, the channel can be directly routed to the pausable decoder 206. This reduces the amount of filtering required by the priority detector 204.

Figure 3:
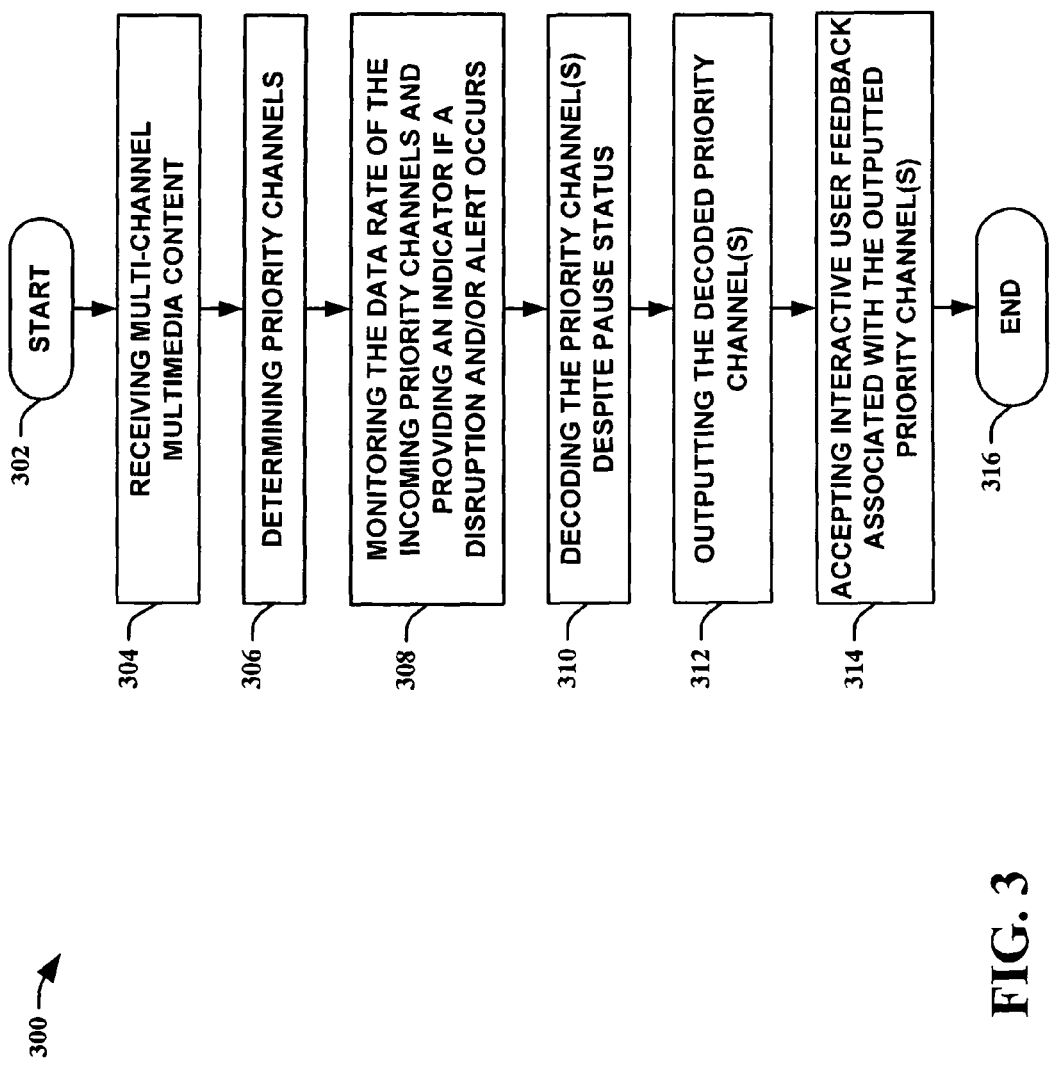
FIG. 3 is a method of providing priority multimedia channel delivery during a pause mode.

A method 300 of providing priority multimedia channel delivery during a pause mode is illustrated in FIG. 3. The method 300 starts 302 by receiving multi-channel multimedia content 304. The multi-channel multimedia content can, at some times, include only a single channel (e.g., the other channels may exist but no content is being distributed over the channel at a particular time). The priority channels are then determined 306 utilizing techniques described above. These include, but are not limited to, using header information, timing information (e.g., a high rate can indicate priority information), PIDs, and/or channel identifiers (e.g., "channel 6" is a security camera channel, etc.) and the like. Additionally, priority determination can be made based on recipient identification, location, and/or recipient input and the like. As an optional feature, the data rate of incoming priority channels can be monitored to determine if a disruption and/or alert occurs 308. For example, the received data rate can be compared to embedded timing and/or rate information to determine if the channel has been disrupted. If the embedded information indicates a much faster rate than the local received rate, the channel is being disrupted (e.g., delayed) and an indicator to that effect can be output so that a recipient knows the channel content has been disrupted in some manner. This is particularly important for information that needs to be received in a timely fashion (e.g., aircraft altitude, etc). Any delays, or disruptions, could cause serious safety issues. Similarly, if an alert is associated with a priority channel it can be output to a recipient as well. For example, weather alerts and other safety alerts and the like.

Once a content channel has been established as a priority channel, it is allowed to be decoded even if a pause mode is in effect 310. This allows the priority content to be viewed by a recipient even when normal content has been paused. For example, processing of priority content even without a pause mode allows recipients to interact via menus and overlays to make selections such as, for example, food, drinks or other service without having to stop a movie or press a call button. Emergency messages, public announcement icons, fasten seat belt icons, weather conditions and restroom available icons can be imposed on a recipient's display independent of what the passenger is watching. Updates of time, weather, flight information, security cameras can be constantly sent and received to a set top box independent of pause or channel selection of a recipient. High security cameras could continue to operate with or without a pause mode in effect as well.

After decoding of the priority content, the content can be output to be processed by, for example, a video decoder 312. Recipients can, upon viewing priority information or otherwise, decide to input information/feedback associated with a priority channel 314, ending the flow 316. This can include, but is not limited to, inputting security codes for decoding priority content, setting alert/disruption indicator sound/viewing levels, selecting which priority content to decode, and/or establishing priority levels for priority content and the like.

Figure 4:
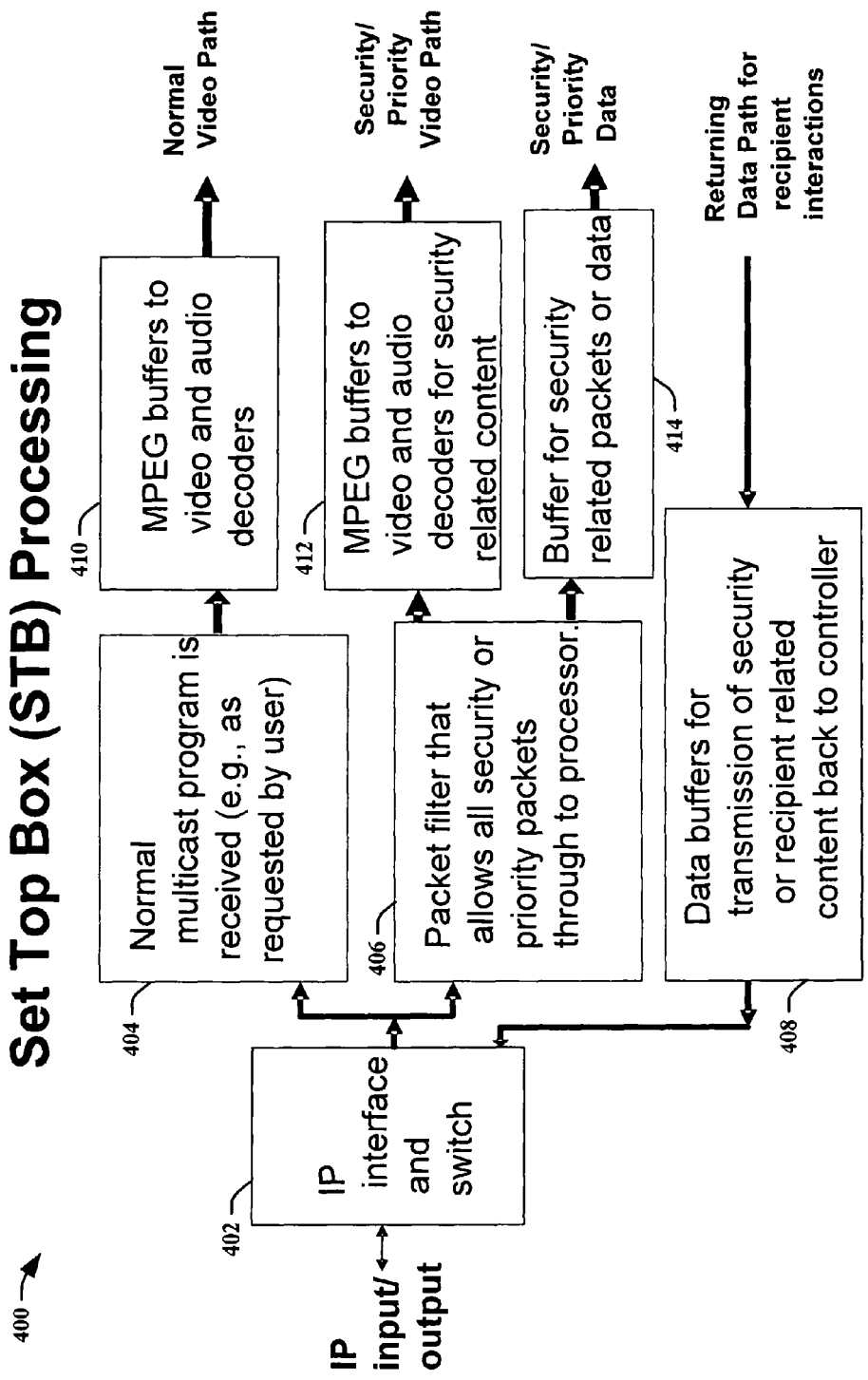
FIG. 4 is an illustration of paused priority channel processing in a Set Top Box environment.

FIG. 4 is an illustration 400 of paused priority channel processing in a set top box (STB) environment. The STB could be in a plane, in a home or apartment or in a business office and the like. In this example, the STB is interfacing with an Internet Protocol (IP) input/output. However, the systems and methods disclosed herein can be utilized with any type of communication system. The IP interface 402 allows normal multicast programming 404 to be buffered for a normal video processing path 410. Security and/or priority packets are sent to a packet filter 406 that determines whether the information is buffered for a security/priority video processing path 412 and/or buffered for a security/priority data processing path 414. Additionally, data buffers 408 are provided to temporarily store recipient and/or security/priority related content that is to be sent back to a main content distribution controller.

Figure 5:
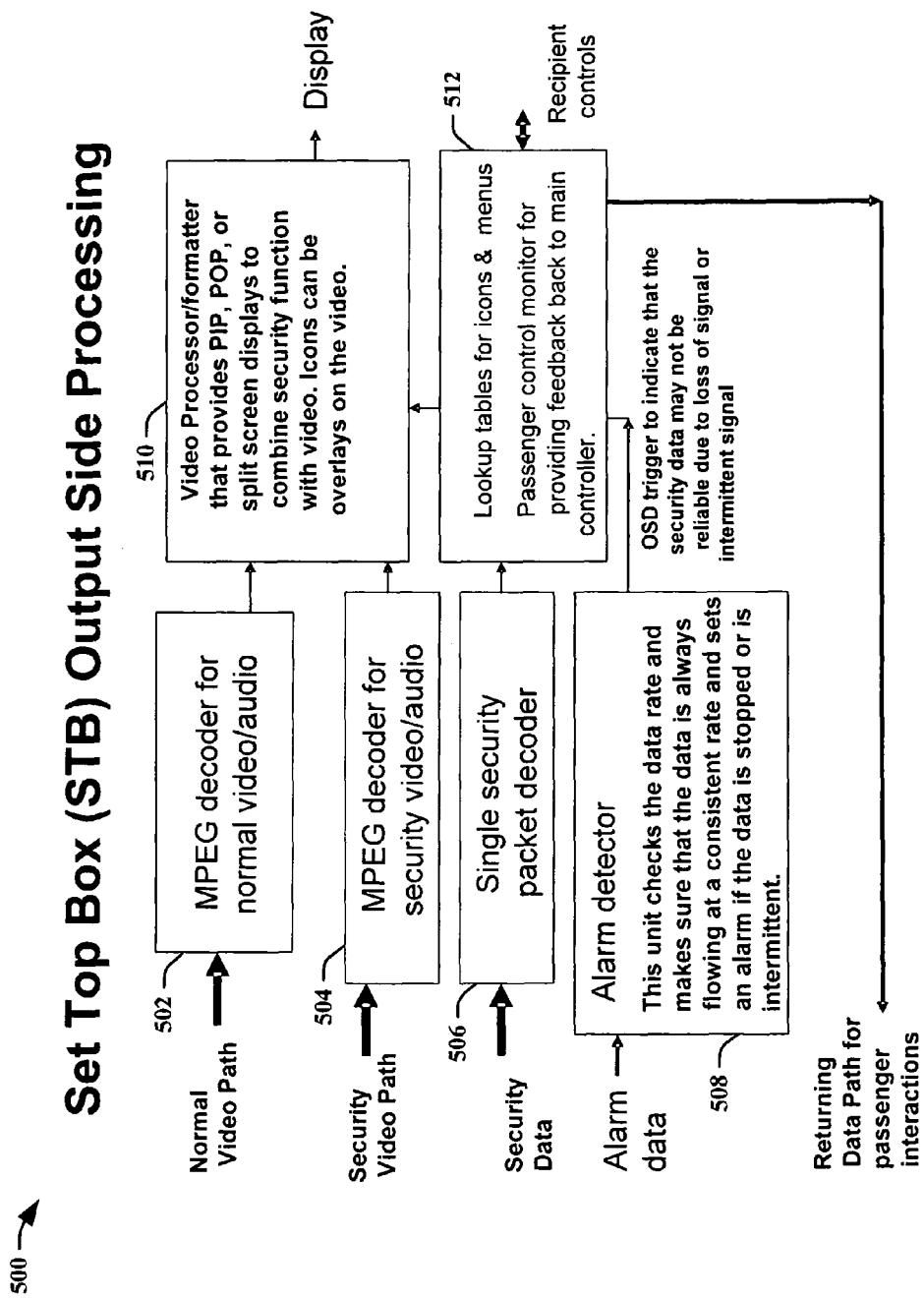
FIG. 5 is an illustration of paused priority channel output side processing in a Set Top Box environment.

FIG. 5 is an example 500 that continues the STB processing on the output side. Normal video path processing proceeds from the buffers 410 to the normal decoder 502. Security/priority video path processing proceeds from the buffers 412 to a security/priority decoder 504. Output from these decoders goes into a video processor 510 for display processing. The security/priority data processing proceeds from the buffers 414 to a security/priority packet decoder 506. Output from the security priority packet decoder 506 goes to a data/control function 512 that contains lookup tables for icons and/or menus and allows interactive recipient controls. A detector function 508 monitors data rates and sets indicators/alarms if a disruption occurs for the priority/security content. This function then outputs information to the data/control function. If the data stops or is interrupted for a time period, a special message packet ('alarm packet') is preferably displayed on the screen (TV/monitor) to indicate to the viewer that an alarm condition exists, e.g., that the data flow has stopped or has been interrupted. An alarm feature according to an aspect of the present principles is advantageous, since a disrupted MPEG can freeze a picture on the display and in the case of a security video, can make a security camera look as if everything is static while some activity that is actually occurring is being masked. A criminal could damage the camera to stop the flow and the hope to freeze the picture to look normal to the guard. By monitoring the packet flow and generating an alarm message, an alarm can be sent out to be displayed on the screen to make the guard aware of the situation.

The video processor 510 can then accept inputs from the data/control function to facilitate in displaying icons for alarms, indicators, etc. and/or to provide overlays of priority content and the like to a display. For example, the priority video can be displayed contemporaneously with the non-priority data on a split screen, picture-in-picture (PIP), etc., to display the priority data on screen at all times, in addition to the normal, non-priority video.

Although the embodiment which incorporates the teachings of the present principles has been shown and described in detail herein, those skilled in the art can readily devise many other varied embodiments that still incorporate these teachings. Having described preferred embodiments for a system and method for allowing selected priority data streams to be displayed in a pausable multimedia content delivery system (which are intended to be illustrative and not limiting), it is noted that modifications and variations can be made by persons skilled in the art in light of the above teachings. It is therefore to be understood that changes can be made in the particular embodiments of the principles disclosed which are within the scope and spirit of the inventive principles as outlined by the appended claims. Having thus described the invention with the details and particularity required by the patent laws, what is claimed and desired protected is set forth in the appended claims.

The invention claimed is:

1. A system for multimedia content delivery, comprising:
a first multimedia decoder responsive to a pause command;
a second multimedia decoder unresponsive to a pause command; and
a priority detector that determines if a data stream is a priority data stream before allowing the data stream to be processed by the second multimedia decoder instead of the first multimedia decoder, wherein the priority detector determines priority from a priority tag included in the data stream, and wherein when a pause command is received, processing by the second multimedia decoder of a priority data stream is unresponsive to the pause command.

2. The system of claim 1, wherein the priority detector determines if a priority data stream is associated with a recipient before allowing the bypassing of the pause command.

3. The system of claim 1, wherein the priority detector monitors a data stream for disruptions in transmission.

4. The system of claim 3, wherein the priority detector compares an embedded data rate to a received data rate to detect disruptions.

5. The system of claim 4, further comprising a disruption indicator for indicating when the priority detector detects a disruption of the received data rate.

6. The system of claim 1, wherein the system selectively outputs display updates from a decoded priority data stream when the system is paused.

7. The system of claim 6, wherein the system further includes a data acceptor that accepts interactive user feedback associated with the display updates when the system is paused.

8. The system of claim 1, wherein the data stream comprises a security data stream.

9. A method for content delivery, comprising:
providing a first processing path through a multimedia decoder that is responsive to a pause command;
providing a second processing path through a multimedia decoder that is unresponsive to a pause command;
determining, with a processor, a processing path based on a priority tag included in a received data stream when a pause command is set;
processing the data stream through the second processing path if the data stream is tagged as a priority data stream, wherein the multimedia decoder is unresponsive to a pause command; and
processing the data stream through the first processing path if the data stream is not tagged as a priority data stream.

10. The system of claim 9, further comprising:
determining if a priority data stream is associated with a recipient before allowing selective processing.

11. The method of claim 9 further comprising:
monitoring the content in the data stream for disruptions in transmission.

12. The method of claim 11, wherein the monitoring includes comparing an embedded content data rate to a received channel data rate to detect disruptions.

13. The method of claim 11 further comprising:
outputting a disruption indicator when a disruption of the received content data rate is detected.

14. The method of claim 9 further comprising:
selectively outputting display updates from the channel during a pause mode.

15. The method of claim 14 further comprising accepting interactive user feedback associated with the display updates during a pause mode.

* * * * *